UNITED STATES PATENT OFFICE.

VALENTIN SCHWARZENBACH, OF BERNE, SWITZERLAND.

IMPROVEMENT IN THE PROCESSES OF GILDING ON GLASS.

Specification forming part of Letters Patent No. 141,670, dated August 12, 1873; application filed March 3, 1873.

*To all whom it may concern:*

Be it known that I, VALENTIN SCHWARZENBACH, of Berne, Switzerland, have invented an Improved Process of Gilding Glass, of which the following is a specification:

Take a solution of pure gold—that is to say, free from all other metals—effected by the ordinary chemical process. When pure gold is employed the work is simple, since it is merely necessary to dissolve it in aqua regia or nitro-muriatic acid, and to evaporate it in the salt-water bath till it crystallizes. In all other cases the operation is more complicated on account of the manipulations necessary for seperating the other metals, and it is generally requisite to precipitate the gold once by oxalic acid or by sulphate of iron to bring it to the desired state of purity. In all cases the crystallized mass of perchlorate of gold should be brought to boiling-point with the water destined for its solution, as it invariably contains a considerable quantity of chloride of gold, insoluble in water, which slowly decomposes in a cold state, very gently, in perchlorate or in metal, but which is instantly effected by coction. After filtration the solution of gold is ready for use. Its dephlegmation is regulated so that two hundred cubic centimeters contain one grain of metallic gold. This solution is then rendered alkaline by soda-lye of mean strength—that is to say, a sufficient quantity is added to it to turn red litmus-paper blue. The addition of the soda should not cause any precipitate, and should never trouble the auriferous liquor. The quantity of soda must necessarily vary according to the dephlegmation of the solution. Before mixing the solution of gold with the principal reactive destined to the reduction of the metal, it is indispensable to prepare the surface of the glass to be gilt with the greatest care, employing the same manipulations and materials used for cleaning photographic glasses. The reactive reductive is then prepared by saturating thirty per cent. of spirits of wine with a current or mixture of marsh gas, or olefiant gas. This operation completed, the spirits of wine is freed with its volume of distilled water. The glass to be gilt is then disposed horizontally on another surface of glass, separated from it about the space of three millimeters. Then twenty-five cubic centimeters of alcohol saturated with the gases are mixed with the auriferous solution. The liquid is then poured between the two glasses and then left to stand for two or three hours, at the expiration of which time the gilding is completed. The upper gilt-plate is then removed, carefully washed, and varnished.

I claim—

The process of gilding on glass, in the manner and for the purposes substantially as described.

PROF. DR. SCHWARZENBACH.

Witnesses:
E. SCHENKER,
RUDOLF ASHMANN.